US012786480B2

(12) United States Patent
Kim et al.

(10) Patent No.: US 12,786,480 B2
(45) Date of Patent: Nov. 3, 2026

(54) APPARATUS AND METHOD FOR IMAGE ENCODING, AND APPARATUS FOR IMAGE DECODING

(71) Applicants: SAMSUNG ELECTRONICS CO., LTD., Suwon-si (KR); POSTECH Research and Business Development Foundation, Pohang-si (KR)

(72) Inventors: Jun Hyuk Kim, Suwon-si (KR); Minkyu Kim, Pohang-si (KR); Hagyeong Lee, Pohang-si (KR); Jaeho Lee, Pohang-si (KR); Seung Eon Kim, Suwon-si (KR); Do Kwan Oh, Suwon-si (KR)

(73) Assignees: SAMSUNG ELECTRONICS CO., LTD., Suwon-si (KR); POSTECH Research and Business Development Foundation, Pohang-si (KR)

( * ) Notice: Subject to any disclaimer, the term of this patent is extended or adjusted under 35 U.S.C. 154(b) by 0 days.

(21) Appl. No.: 18/808,909

(22) Filed: Aug. 19, 2024

(65) Prior Publication Data

US 2025/0240463 A1 Jul. 24, 2025

(30) Foreign Application Priority Data

Jan. 22, 2024 (KR) ........................ 10-2024-0009324

(51) Int. Cl.
*G06V 20/70* (2022.01)
*G06V 10/44* (2022.01)
(Continued)

(52) U.S. Cl.
CPC ............. *H04N 19/91* (2014.11); *G06V 10/44* (2022.01)

(58) Field of Classification Search
CPC ............................... H04N 19/91; G06V 10/44
(Continued)

(56) References Cited

U.S. PATENT DOCUMENTS 11,750,848 B2 9/2023 Toderici et al.
11,869,221 B2 * 1/2024 Johnston ................ G06N 3/045
(Continued)

FOREIGN PATENT DOCUMENTS

EP 4241445 A1 9/2023

OTHER PUBLICATIONS

Shiyu Qin, et al., "Perceptual Image Compression with Cooperative Cross-Modal Side Information", arXiv:2311.13847v2 [cs.CV], Nov. 28, 2023, 11 pages.
(Continued)

*Primary Examiner* — Albert Kir
(74) *Attorney, Agent, or Firm* — Sughrue Mion, PLLC

(57) ABSTRACT

An image encoding apparatus includes: at least one processor configured to implement: a text adaptation module configured to generate relevance information indicating a relevance between an image feature and a text feature based on text caption information corresponding to an original image; and an encoding module configured to generate a latent representation which represents the text caption information and the image feature using the relevance information and the original image, wherein the text adaptation module is further configured to communicate with the encoding module while generating the relevance information.

20 Claims, 11 Drawing Sheets

(51) Int. Cl.
*G06V 10/82* (2022.01)
*H04N 19/91* (2014.01)

(58) Field of Classification Search
USPC ..................................................... 375/240.12
See application file for complete search history.

(56) References Cited

U.S. PATENT DOCUMENTS

| | | | | |
|---|---|---|---|---|
| 12,524,937 | B2 * | 1/2026 | Park | G06T 11/60 |
| 2006/0109148 | A1 * | 5/2006 | Yi | H03M 7/3088 375/E7.161 |
| 2023/0154213 | A1 | 5/2023 | Gao et al. | |
| 2023/0169794 | A1 | 6/2023 | Kezele et al. | |
| 2023/0196633 | A1 | 6/2023 | Zhou et al. | |
| 2023/0229960 | A1 | 7/2023 | Zhu et al. | |
| 2024/0296607 | A1 * | 9/2024 | Li | G06T 11/60 |
| 2024/0320872 | A1 * | 9/2024 | Hinz | G06F 40/40 |
| 2024/0355022 | A1 * | 10/2024 | Shi | G06T 9/00 |
| 2025/0022099 | A1 * | 1/2025 | Song | G06T 5/50 |
| 2025/0259321 | A1 * | 8/2025 | Antsfeld | G06T 7/55 |

OTHER PUBLICATIONS

N. Mital, et al., "Neural Distributed Image Compression with Cross-Attention Feature Alignment," 2023 IEEE/CVF Winter Conference on Applications of Computer Vision (WACV), 2023, pp. 2498-2507, doi: 10.1109/WACV56688.2023.00253.

Tsachy Weissman, "Toward Textual Transform Coding," in IEEE Bits the Information Theory Magazine, vol. 3, No. 2, arXiv:2305.01857v1 [cs.IT], May 3, 2023, 11 pages, doi: 10.1109/MBITS.2023.3339111.

Xuhao Jiang, et al., "Multi-modality Deep Network for Extreme Learned Image Compression", The Thirty-Seventh AAAI Conference on Artificial Intelligence (AAAI-23), Feb. 7, 2023, 9 pages.

Fabrice Bellard., "BPG Image format", Apr. 21, 2018, 2 pages, https://bellard.org/bpg/.

G. K. Wallace, "The JPEG still picture compression standard", IEEE transactions on consumer electronics, vol. 38, No. 1, Feb. 1992, 15 pages, doi: 10.1109/30.125072.

Johannes Ballé, et al., "Variational Image Compression With a Scale Hyperprior", ICLR 2018, arXiv:1802.01436v2 [eess.IV], May 1, 2018, 23 pages.

Zhengxue Cheng, et al., Learned image compression with discretized gaussian mixture likelihoods and attention modules, ,CVPR 2020, arXiv:2001.01568v3 [eess.IV], Mar. 30, 2020, 15 pages.

Yueqi Xie, et al., "Enhanced invertible encoding for learned image compression", ACM International Conference on Multimedia 2021, arXiv:2108.03690v1 [eess.IV], Aug. 8, 2021, 9 pages, https://doi.org/10.1145/3474085.3475213.

David Minnen, et al., "Joint Autoregressive and Hierarchical Priors for Learned Image Compression," 32nd Conference on Neural Information Processing Systems (NIPS 2018), arXiv:1809.02736v1 [cs.CV], Sep. 8, 2018, 22 pages.

Fabian Mentzer, et al.,"High-Fidelity Generative Image Compression", 34th Conference on Neural Information Processing Systems (NeurIPS 2020), arXiv:2006.09965v3 [eess.IV], Oct. 23, 2020, 20 pages.

* cited by examiner

APPARATUS AND METHOD FOR IMAGE ENCODING, AND APPARATUS FOR IMAGE DECODING

CROSS-REFERENCE TO RELATED APPLICATION(S)

This application is based on and claims priority under 35 U.S.C. § 119 to Korean Patent Application No. 10-2024-0009324, filed on Jan. 22, 2024, in the Korean Intellectual Property Office, the disclosure of which is incorporated by reference herein in its entirety.

BACKGROUND

1. Field

The disclosure relates to an image encoding technology, and more particularly, to an image encoding technology that reflects semantic information contained in text captions.

2. Description of Related Art

Data compression algorithms may be classified into lossless compression algorithms and lossy compression algorithms. The lossy compression algorithms may generally be used for image compression. Human-designed compression algorithms may be used for lossy compression, such as Joint Photographic Experts Group (JPEG), Better Portable Graphics (BPG), etc., however a neural network compression system for learning compression methods is being developed, and the system may be trained to minimize human perceptual distortion. The neural network compression system may include: encoding features of input data; generating a code by quantizing the extracted features; and decoding for reconstructing the code back into image data.

SUMMARY

In accordance with an aspect of the disclosure, an image encoding apparatus includes: at least one processor configured to implement: a text adaptation module configured to generate relevance information indicating a relevance between an image feature and a text feature based on text caption information corresponding to an original image; and an encoding module configured to generate a latent representation which represents the text caption information and the image feature using the relevance information and the original image, wherein the text adaptation module is further configured to communicate with the encoding module while generating the relevance information.

The text adaptation module may include: a first module configured to generate an embedding vector based on the text caption information, wherein the embedding vector is included in a latent space shared by image and text; and a second module configured to generate the relevance information based on the obtained embedding vector and an intermediate image feature generated by the encoding module.

The second module may include one or more layers configured to obtain the relevance information by gradually reducing a domain difference between the image and the text of the embedding vector using cross-attention processing.

The second module may further include: a first adaptation layer configured to receive a first intermediate image feature generated by the encoding module, and to generate first relevance information based on the first intermediate image feature using the cross-attention processing; and a second adaptation layer configured to receive a second intermediate image feature generated by the encoding module based on the first relevance information, and to generate second relevance information based on the second intermediate image feature using the cross-attention processing.

The second module may further include a third adaptation layer configured to generate an updated text feature based on the second intermediate image feature using the cross-attention processing, and wherein the second adaptation layer is configured to output the second relevance information based on the updated text feature and the second intermediate image feature.

At least one of the first adaptation layer, the second adaptation layer, and the third adaptation layer may include a linear module configured to apply a linear function to a result of the cross-attention processing.

The encoding module may include: a first encoding layer configured to receive the image and to generate the first intermediate image feature; and a second encoding layer configured to generate the second intermediate image feature based on the first intermediate image feature and the first relevance information.

The encoding module may further include a third encoding layer configured to output the latent representation based on the second intermediate image feature and the second relevance information.

Each of the first encoding layer, the second encoding layer, and the third encoding layer may include at least one of a convolutional neural network (CNN), a residual block, and an attention module.

The image encoding apparatus may further include an entropy module configured to perform entropy encoding on the latent representation to transform the latent representation into a bitstream.

In accordance with an aspect of the disclosure, an image decoding apparatus includes: at least one processor configured to implement: an entropy module configured to perform entropy decoding on a bitstream generated by an image encoding apparatus based on a latent representation which represents text caption information and an image feature associated with an original image; and a decoding module configured to generate a reconstructed image corresponding to the original image based on a result of the entropy decoding.

In accordance with an aspect of the disclosure, an image encoding method for encoding an image using an image encoding apparatus, includes: using a text adaptation module included in the image encoding apparatus, communicating with an encoding module included in the image encoding apparatus to generate relevance information indicating a relevance between an image feature and a text feature based on text caption information corresponding to an original image; and using the encoding module, generating a latent representation which represents the text caption information and the image feature using the relevance information based on the original image.

The generating of the relevance information may include: generating an embedding vector, which is included in a latent space shared by image and text, based on the text caption information; and generating the relevance information based on the embedding vector and an intermediate image feature generated by the encoding module.

The generating of the relevance information may further include: generating first relevance information based on a first intermediate image feature using cross-attention processing, wherein the first intermediate image feature is generated by the encoding module; and generating second relevance information based on a second intermediate image feature using the cross-attention processing, wherein the second intermediate image feature is generated by the encoding module based on the first relevance information.

The obtaining of the relevance information may further include generating an updated text feature based on the second intermediate image feature using the cross-attention processing, and wherein the second relevance information is generated based on the updated text feature and the second intermediate image feature.

The generating of the latent representation may include: obtaining the first intermediate image feature based on the original image; and obtaining the second intermediate image feature based on the first intermediate image feature and the first relevance information.

The latent representation may be generated based on the second intermediate image feature and the second relevance information.

The method may further include performing, using an entropy module included in the image encoding apparatus, entropy encoding on the latent representation to transform the latent representation into a bitstream.

In accordance with an aspect of the disclosure, an electronic device includes: a memory configured to store one or more instructions; and at least one processor configured to implement a text adaptation module configured to generate relevance information indicating a relevance between an image feature and a text feature based on text caption information corresponding to an original image; an encoding module configured to generate a latent representation which represents the text caption information and the image feature using the relevance information based on the original image; an entropy module configured to perform entropy encoding on the latent representation to generate a bitstream, and to perform entropy decoding on the generated bitstream to generate a reconstructed bitstream; and a decoding module configured to generate a reconstructed image corresponding to the original image based on a result of the entropy decoding, wherein the text adaptation module is further configured to communicate with the encoding module while generating the relevance information.

The at least one processor may be further configured to implement a training module configured to train at least one of the text adaptation module, the encoding module, and the decoding module such that a value of a predetermined multi-modal objective function is minimized.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
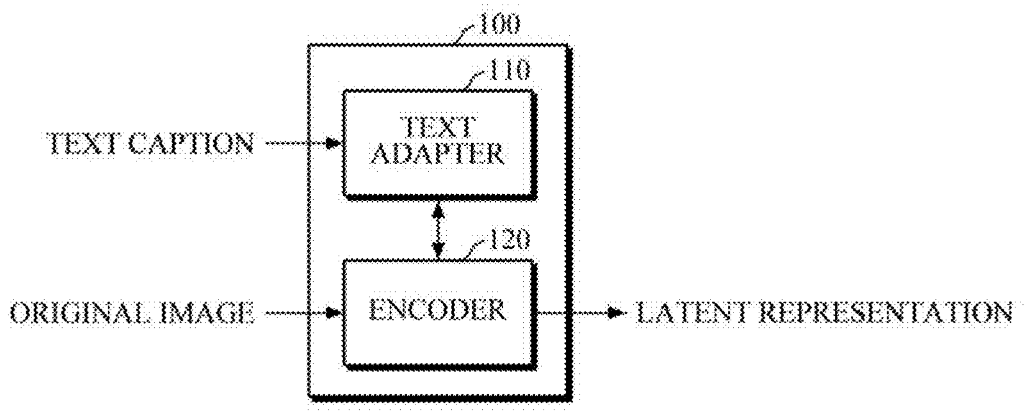
FIG. 1 is a block diagram illustrating an image encoding apparatus according to an embodiment of the present disclosure.

Details of some example embodiments are included in the following detailed description and drawings. Advantages and features of the disclosure, and a method of achieving the same will be more clearly understood from the following embodiments described in detail with reference to the accompanying drawings. Throughout the drawings and the detailed description, unless otherwise described, the same drawing reference numerals will be understood to refer to the same elements, features, and structures.

It will be understood that, although the terms first, second, etc. may be used herein to describe various elements, these elements should not be limited by these terms. These terms are only used to distinguish one element from another. Any references to singular may include plural unless expressly stated otherwise. In addition, unless explicitly described to the contrary, an expression such as "comprising" or "including" will be understood to imply the inclusion of stated elements but not the exclusion of any other elements.

As is traditional in the field, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the present scope. Further, the blocks, units and/or modules of the embodiments may be physically combined into more complex blocks, units and/or modules without departing from the present scope.

FIG. 1 is a block diagram illustrating an image encoding apparatus according to an embodiment of the present disclosure.

An image encoding apparatus 100 may be included in electronic devices, for example mobile devices such as smartphones, tablet personal computers (PCs), etc., smart wearable devices, image processing devices such as extended reality devices (e.g., virtual reality (VR) devices, augmented reality (AR) devices, mixed reality (MR) devices, extended Reality (XR) devices, etc.), image storage devices, and image processing cloud systems for editing and generating new image content. The following examples of the image encoding apparatus may be applied to encoding of various signals, such as video and audio signals, in addition to images. In addition, the examples of the image encoding apparatus may also be applied to algorithms for editing and generating text-based images.

Referring to FIG. 1, the image encoding apparatus 100 may include a text adapter 110 and an encoder 120. In embodiments, the text adapter 110 may be referred to as a text adaptation module, and the encoder 120 may be referred to as an encoding module. In embodiments, the image encoding apparatus 100 may include one or more processors, and the text adapter 110 and the encoder 120 may be implemented by the image encoding apparatus 100 using the one or more processors.

The text adapter 110 may obtain relevance information indicating a relevance between an image feature and a text feature using, as an input, text caption information for an original image. The obtained relevance information may be provided to the encoder 120, so that when the encoder 120 encodes an image, the text feature may be effectively embedded in the image feature. The text adapter 110 may interact with the encoder 120 while the encoder 120 encodes an image, to reduce a domain difference between the image feature and the text feature. In embodiments, the text adapter 110 may interact with the encoder 120 by communicating with the encoder 120, for example by performing at least one of transmitting information to the encoder 120, and receiving information from the encoder 120.

For example, the text adapter 110 may receive an intermediate image feature generated by the encoder 120, and may provide relevance information, generated based on the intermediate image feature, to the encoder 120. The text adapter 110 may include a plurality of layers, and each layer may interact with the encoder 120 to gradually reduce the domain difference between the image feature and the text feature. For example, this may mean that the text adapter 110 may communicating with the encoder 120 with respect to each layer, for example by performing at least one of transmitting information corresponding to each layer to the encoder 120, and receiving information corresponding to each layer from the encoder 120, but embodiments are not limited thereto. Accordingly, the encoder 120 may obtain a latent representation that preserves information from both modalities of image feature and text capture feature, thereby minimizing or otherwise decreasing perceptual distortion during image encoding.

The text adapter 110 may be implemented based on a neural network, and may include a cross-attention mechanism. For example, the neural network may include at least one of a convolutional neural network (CNN), a recurrent neural network (RNN), a transformer-based neural network, etc., but embodiments are not limited thereto, and other neural networks may be used as appropriate.

Using the original image as an input, the encoder 120 may interact with the text adapter 110 to obtain a low-dimensional latent representation including the image feature in which the text caption information is reflected. For example, this may mean that the image representation includes a representation of, or otherwise represents, the text caption information and the image feature. The encoder 120 may include one or more layers configured to output one or more image features, and may provide intermediate image features, which may be output by one or more layers before the final layer, to the text adapter 110. The encoder 120 may obtain the low-dimensional latent representation including the image feature, in which the text caption information is reflected, using the relevance information which is provided by the text adapter 110. In embodiments, an image feature in which text caption information is reflected may refer to, for example, an image feature which is generated or obtained with respect to, in consideration of, or based on the text caption information.

In embodiments, the term "latent representation" may refer to an output of a neural network based on an input including an input image or motion information, and may collectively refer to a latent feature, latent vector, and the like. The encoder 120 may be implemented based on a neural network, and the neural network may include a CNN, an RNN, a transformer-based neural network, etc. However, embodiments are not limited thereto, and any other neural networks may be used as appropriate.

Figure 2:
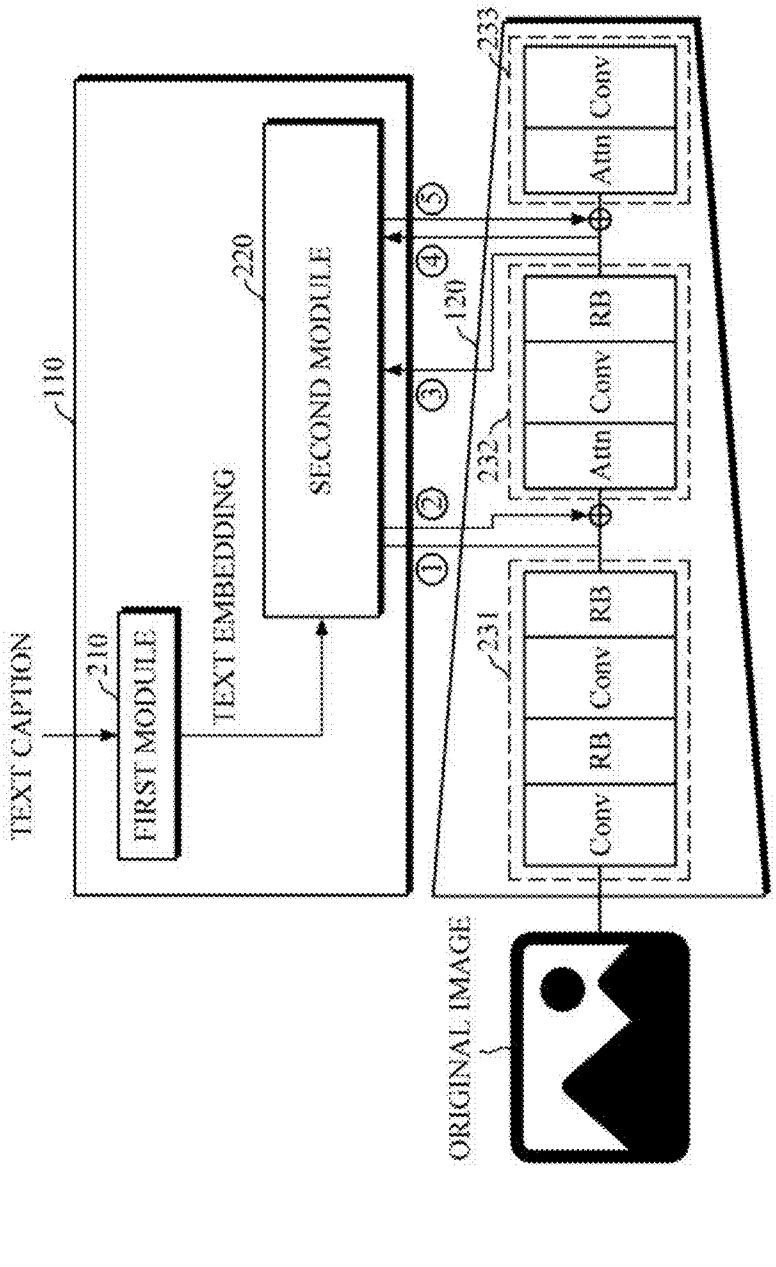
FIG. 2 is a diagram explaining interaction between a text adapter and an encoder according to an embodiment of the present disclosure.
Figure 3:
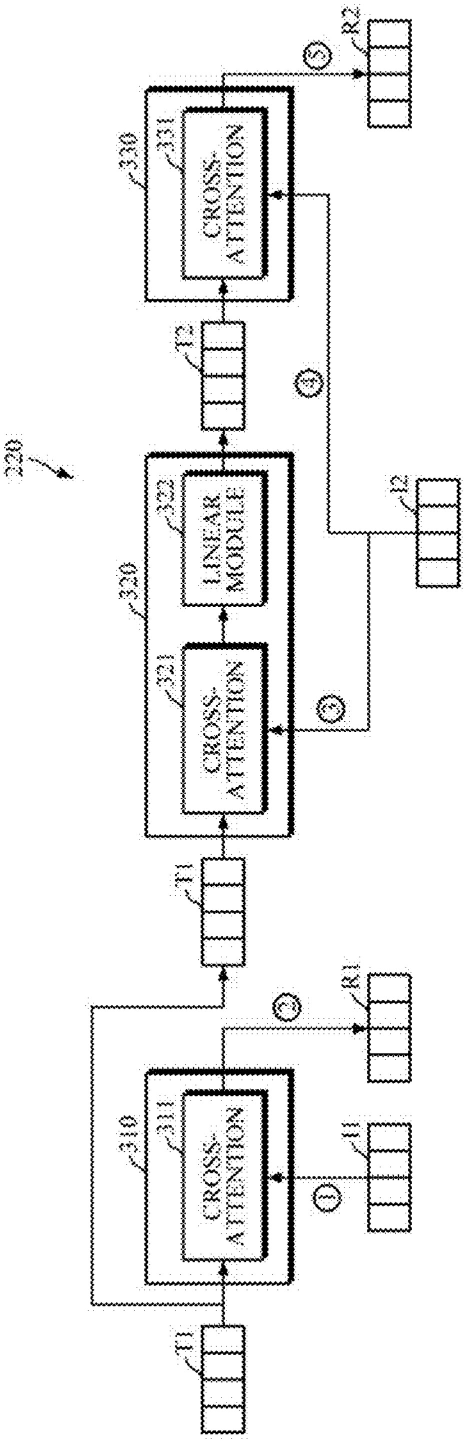
FIG. 3 is a diagram illustrating an example of a text adapter according to an embodiment of the present disclosure.

FIG. 2 is a diagram explaining interaction between a text adapter and an encoder. FIG. 3 is a diagram illustrating an example of a text adapter.

Referring to FIGS. 2 and 3, the text adapter 110 may include a first module 210 and a second module 220. The first module 210 may obtain an embedding vector (illustrated as "TEXT EMBEDDING"), which may be included in a latent space corresponding to image and text, based on text caption information. The first module 210 may be, for example, a vision-text encoder based on a contrastive language-image pre-training (CLIP) model.

The second module 220 may obtain relevance information indicating a relevance between an image feature and a text feature based on the embedding vector obtained by the first module 210, and an intermediate image feature provided by the encoder 120. For example, referring to FIG. 3, the second module 220 may include a plurality of layers such as a layer 310, a layer 320, and a layer 330, each of which may have a bidirectional structure and may be configured to obtain or generate relevance information by gradually reducing a domain difference between image and text of the embedding vector. The number of layers and modules illustrated in FIG. 3 is merely an example, and embodiments are not limited thereto. For example, in some embodiments the number of layers included in the second module 220 may correspond to a number of layers included in the encoder 120.

As shown in FIG. 3, the first to third layers 310, 320, and 330 may include cross-attention modules 311, 312, and 313 configured to determine relevance between the image feature and the text feature using a cross-attention mechanism, which may be referred to as performing cross-attention processing. In addition, at least some of the layers (e.g., the second layer 320) may further include a linear module 322 configured to apply a linear function to a result of cross-attention processing performed by the cross-attention module 312 based on pre-stored weights and biases.

As described above, the encoder 120 may include a first layer 231, a second layer 232, and a third layer 233. Each of the first to third layers 231, 232, and 233 may include at least one of a CNN Conv, a residual block RB, and an attention module Attn. For example, the first layer 231 may include two CNNs Conv and two residual blocks RB, the second layer 232 may include the attention module Attn, the CNN Conv, and the residual block RB, and the third layer 233 may include the attention module Attn and the CNN Conv. Although FIG. 2 illustrates the encoder 120 as including a particular number of layers and modules, embodiments are not limited thereto, and the number of layers and modules may vary based on the purpose and accuracy of encoding of images, videos, audios, and the like.

As shown in FIGS. 2-3, the encoder 120 may output a first image feature I1 that is generated using two CNNs Conv and two residual blocks RB, and may provide the output first image feature I1 to the first layer 310 of the second module 220 at ①. The second module 220 may generate first relevance information R1 indicating a relevance between a first text feature T1 and the first image feature I1 using the cross-attention module 311 in the first layer 310, and may provide the generated first relevance information R1 to the encoder 120 at ②. The first relevance information R1 may be combined with the first image feature I1 output from the first layer 231 of the encoder 120, to be input to the second layer 232.

The encoder 120 may output a second image feature 12 that is generated based on the first relevance information R1 using the attention module Attn, the CNN Conv, and the residual block RB, and may provide the output second image feature 12 to the second layer 320 of the second module 220 at ③, and to the third layer 330 of the second module 220 at ④.

The second module 220 may output a second text feature T2, in which the second image feature 12 is reflected, using the cross-attention module 321 and the linear module 322 in the second layer 320, and may input the output the second text feature T2 to the third layer 330. In embodiments, a text feature in which an image feature is reflected may refer to, for example, a text feature which is generated or obtained with respect to, in consideration of, or based on the image feature. In addition, the third layer 330 may generate, using the cross-attention module 331, second relevance information R2 indicating a relevance between the second text feature T2 output by the second layer 320 and the second image feature 12 provided by the encoder 120, and may provide the second relevance information R2 to the encoder 120 at ⑤.

The encoder 120 may output a latent representation, which includes or represents both text caption information and a final image feature, based on the second relevance information R2 using the attention module Attn and the CNN Conv in the third layer 233.

Figure 4:
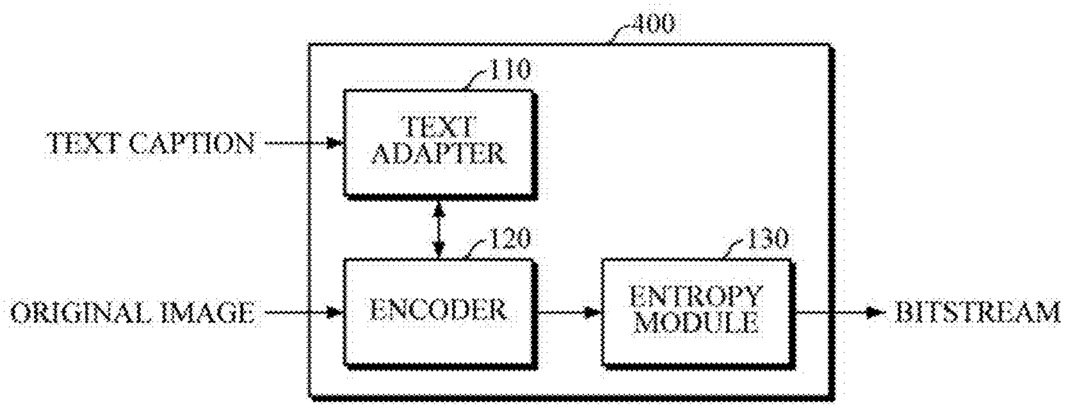
FIG. 4 is a block diagram illustrating an image encoding apparatus according to other embodiments of the present disclosure.

FIG. 4 is a block diagram illustrating an image encoding apparatus according to other embodiments of the present disclosure.

Referring to FIG. 4, an image encoding apparatus 400 may include the text adapter 110, the encoder 120, and an entropy module 130. In embodiments, the image encoding apparatus 400 may include one or more processors, and the text adapter 110 and the encoder 120 may be implemented by the image encoding apparatus 400 using the one or more processors. Examples of the text adapter 110 and the encoder 120 are described in detail above, and redundant or duplicative description thereof may be omitted.

The entropy module 130 may include an entropy encoder. After the encoder 120 outputs a latent representation including an image feature in which text caption information is reflected, the entropy module 130 may perform entropy encoding on the output latent representation to generate a bitstream of the latent representation. The entropy module 130 may perform entropy encoding on the latent representation using a probability distribution (e.g., a mean u and a standard deviation σ) which may be a predetermined probability distribution that may be determined through training or estimated using a probability distribution estimator. The entropy encoding may be performed using common arithmetic encoding, etc., but embodiments are not limited thereto. The probability distribution may be learned or estimated based on various probability models, which may include at least one of a Laplacian distribution model and a Gaussian distribution model, but embodiments are not limited thereto. In embodiments, the probability distribution estimator may include at least one of a hyperprior encoder, a hyperprior decoder, a context estimator, a CNN, an RNN, a transformer-based neural network, and the like.

Figure 5:
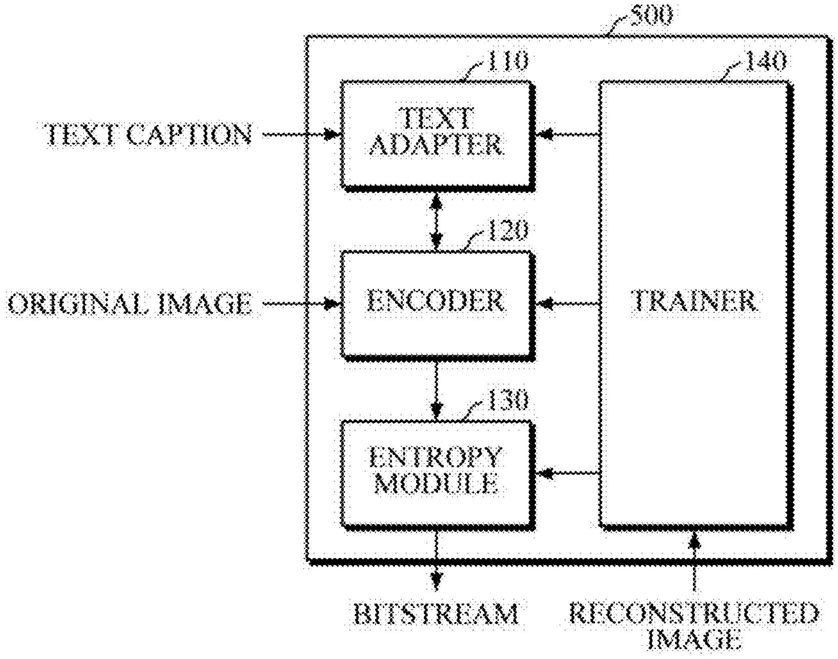
FIG. 5 is a block diagram illustrating an image encoding apparatus according to other embodiments of the present disclosure.

FIG. 5 is a block diagram illustrating an image encoding apparatus according to other embodiments of the present disclosure.

Referring to FIG. 5, an image encoding apparatus 500 may include the text adapter 110, the encoder 120, the entropy module 130, and a trainer 140. In embodiments, the trainer 140 may be referred to as a training module. In embodiments, the image encoding apparatus 500 may include one or more processors, and the text adapter 110, the encoder 120, the entropy module 130, and the trainer 140 may be implemented by the image encoding apparatus 400 using the one or more processors. Examples of the text adapter 110, the encoder 120, and the entropy module 130 are described in detail above, and redundant or duplicative description thereof may be omitted.

The trainer 140 may train at least one of the text adapter 110, the encoder 120, and the entropy module 130 using a multi-modal objective function for preserving text information. The multi-modal objective function may be designed to narrow the semantic gap between a reconstructed image and text caption based on a typical loss function that quantifies a difference between the reconstructed image and the original image by considering at least one of bitrate, numerical/perceptual distortion, realism, and the like. The multi-modal objective function may be designed based on, for example, a CLIP model. For example, the loss function may include at last one of peak signal-to-noise ratio (PSNR), mean squared error (MSE), cross-entropy loss, binary cross-entropy loss, log likelihood loss, frequency domain loss, etc., but embodiments are not limited thereto.

For example, using, as an input, the reconstructed image reconstructed by an image decoding apparatus, the trainer 140 may calculate a value of the multi-modal objective function, e.g., at least one of a compression ratio of the reconstructed image, a numerical distortion, and a perceptual difference between the original image and the reconstructed image, and may train at least one of the text adapter 110, the encoder 120, and the entropy module 130 so that the calculated value of the multi-modal objective function is minimized or decreased to below a predetermined threshold value. In embodiments, at least one of the image encoding apparatus 500 and the trainer 140 may further include a decoder of an image decoding apparatus which is described in greater detail below.

Figure 6:
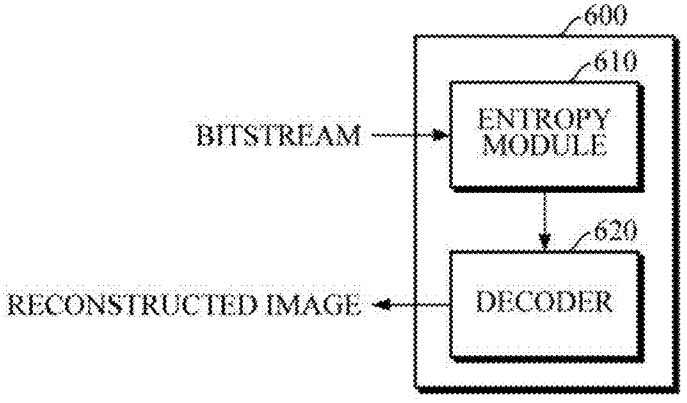
FIG. 6 is a block diagram illustrating an image decoding apparatus according to an embodiment of the present disclosure.

FIG. 6 is a block diagram illustrating an image decoding apparatus according to an embodiment of the present disclosure.

Referring to FIG. 6, an image decoding apparatus 600 may include an entropy module 610 and a decoder 620. In embodiments, the decoder 620 may be referred to as a decoding module. In embodiments, the image decoding apparatus 600 may include one or more processors, and the entropy module 610 and a decoder 620 may be implemented by the image encoding apparatus 600 using the one or more processors.

The entropy module 610 may include an entropy decoder. The entropy module 610 may reconstruct a latent representation by performing entropy decoding using a bitstream as an input, for example a bitstream generated by one or more of the image encoding apparatus 100, the image encoding apparatus 400, and the image encoding apparatus 500. The entropy module 610 may perform entropy decoding on the latent representation using a probability distribution (e.g., a mean u and a standard deviation σ) which may be a predetermined probability distribution that may be determined through training or estimated using a probability distribution estimator, as discussed above. The entropy decoding may be performed using common arithmetic encoding, etc., but embodiments are not limited thereto. The probability distribution may be obtained based on various probability models, such as at least one of a Laplacian distribution model and a Gaussian distribution model, and the like.

The decoder 620 may generate a reconstructed image based on the latent representation reconstructed by the entropy module 610. In some embodiments, separate text caption information is not input to the image decoding apparatus 600 during image decoding, such that a capacity used for storing text captions may be reduced. For example, captions may be reconstructed by applying a predetermined captioning algorithm to the reconstructed image.

In some embodiments, the image decoding apparatus 600 may further include the trainer 140 discussed above. Using the image reconstructed by the decoder 620 as an input, the trainer may train at least one of the entropy module 610 and the decoder 620 so that a value of the multi-modal objective function is minimized or otherwise decreased, as described above.

Figure 7:
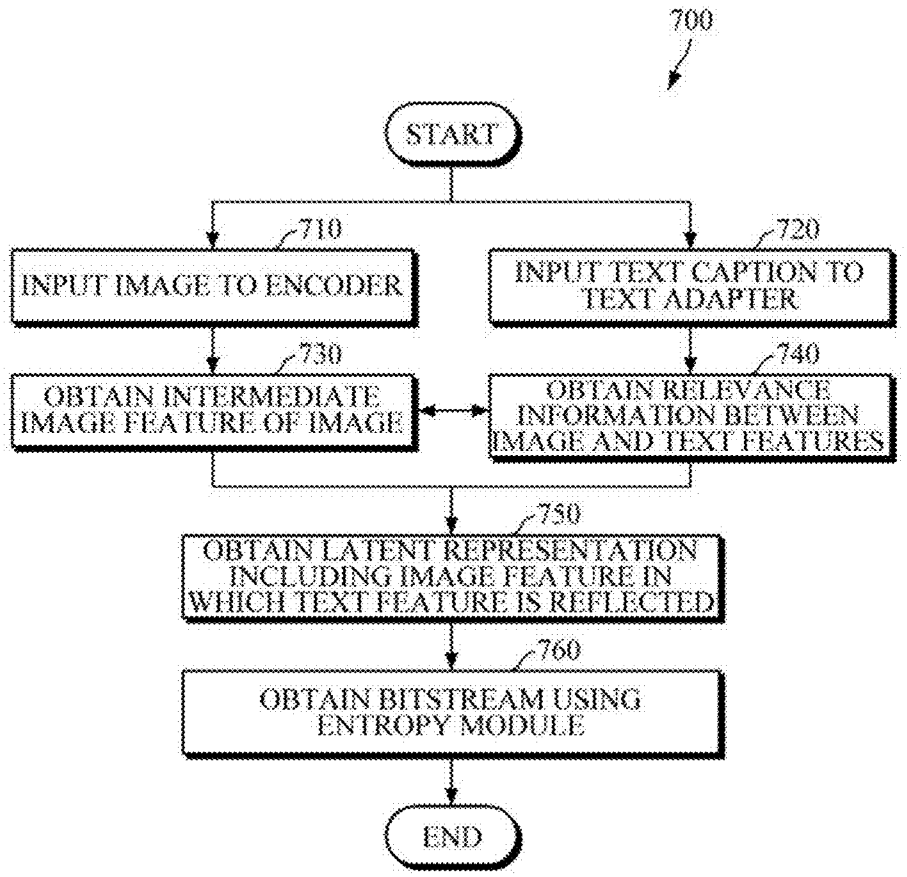
FIG. 7 is a flowchart illustrating an image encoding method according to an embodiment of the present disclosure.

FIG. 7 is a flowchart illustrating an image encoding process according to an embodiment of the present disclosure. Although the description of the process 700 is provided below with reference to the image encoding apparatus 400, embodiments are not limited thereto. For example, in some embodiments the process 700 may be performed by at least one of the image encoding apparatus 100 and the image encoding apparatus 500 discussed above, or any other image encoding apparatus.

First, an original image may be input to the encoder 120 of the image encoding apparatus 400 at operation 710, and a text caption corresponding to the original image may be input to the text adapter 110 of the image encoding apparatus 100 at operation 720.

Then, the encoder 120 may interact with the text adapter 110 to obtain an intermediate image feature and may provide the obtained intermediate image feature to the text adapter 110 at operation 730, and the text adapter 110 may interact with the encoder 120 to obtain relevance information by gradually reducing a domain difference between image and text features provided by the encoder 120, and may provide the obtained relevance information to the encoder at operation 740. In embodiments, the encoder 120 and the text adapter 110 may interact with each other by communicating with each other, for example by transmitting or receiving information such as the intermediate image features, the text features, and the relevance information. In embodiments, the text features may correspond to the first text feature T1 and the second text feature T2, the intermediate image features may correspond to the first mage feature I1 and the second image feature 12, and the relevance information may correspond to the first relevance information R1 and the second relevance information R2 discussed above.

Subsequently, the encoder 120 may obtain a latent representation including a final image feature, in which the text feature is reflected, based on relevance information finally provided by the text adapter 110 at operation 750.

Then, the entropy module may perform entropy encoding using the latent representation as an input, to obtain a bitstream at operation 760.

Figure 8:
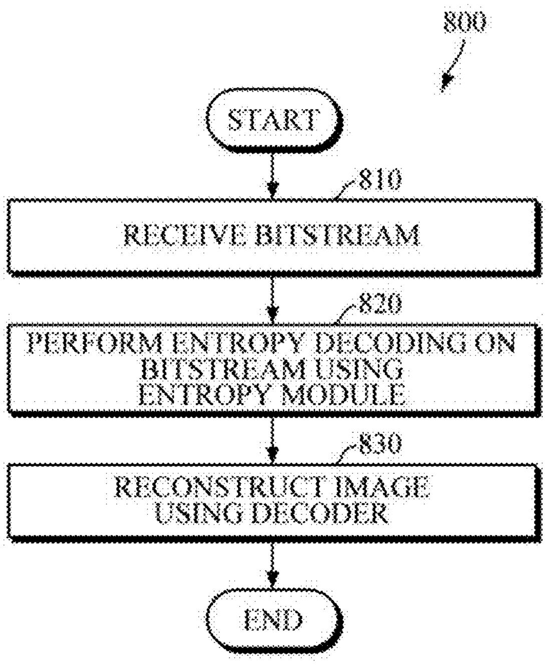
FIG. 8 is a flowchart illustrating an image decoding method according to an embodiment of the present disclosure.

FIG. 8 is a flowchart illustrating an image decoding process according to an embodiment of the present disclosure. Although the description of the process 800 is provided below with reference to the image decoding apparatus 600, embodiments are not limited thereto.

First, the image decoding apparatus 600 may receive a bitstream corresponding to the original image to be reconstructed at operation 810. The bitstream may be generated as a result of entropy encoding of a latent representation which may be transformed to preserve both the text caption information and the image feature by interaction between the text adapter 110 and the encoder 120 of the image encoding apparatus 400.

Then, the entropy module 610 of the image decoding apparatus 600 may perform entropy decoding on the received bitstream to reconstruct the latent representation that preserves both the text caption information and the image feature at operation 820.

Subsequently, the decoder 620 of the image encoding apparatus 600 may reconstruct an image at operation 830 based on a latent representation reconstructed at operation 820.

Figure 9:
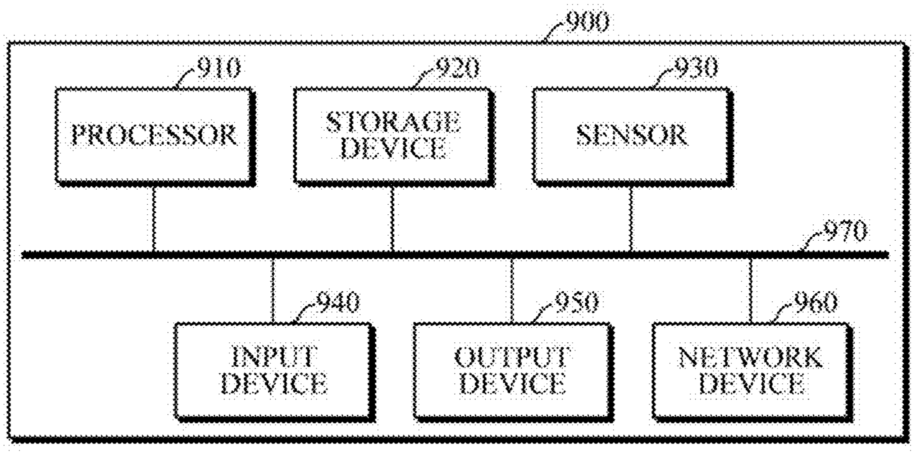
FIG. 9 is a block diagram illustrating an electronic device according to an embodiment of the present disclosure.

FIG. 9 is a block diagram illustrating an electronic device according to an embodiment of the present disclosure.

As shown in FIG. 9, an electronic device 900 may perform at least one of the aforementioned image encoding functions and image decoding functions. The electronic device 900 may include, for example, various image transmission/reception devices, such as a televisions (TVs), monitors, Internet of Things (IoT) devices, radar devices, smartphones, wearable devices, tablet PCs, netbooks, laptops, desktop computers, head mounted displays (HMDs), autonomous vehicles, smart vehicles, VR devices, AR devices, MR devices, XR devices, automobiles, mobile robots, etc., as well as cloud computing devices, and the like.

The electronic device 900 may include a processor 910, a storage device 920, a sensor 930, an input device 940, an output device 950, and a network device 960. The processor 910, the storage device 920, the sensor 930, the input device 940, the output device 950, and the network device 960 may communicate with each other through a communication bus 970.

The processor 910 may perform functions and instructions to be executed in the electronic device 900. For example, the processor 910 may process instructions stored in the storage device 920. The processor 910 may execute instructions to perform various operations including at least one of encoding images and decoding of images, as described above.

The storage device 920 may store information or data used for the processing operation of the processor 910. For example, the data may include at least one of the bitstream and the original and reconstructed images that are used and generated in the image encoding and/or decoding processes, and information related to the respective components. Further, the storage device 920 may store instructions to be executed by the processor 910. The storage device 920 may include a computer-readable storage medium, for example at least one of random access memories (RAM), dynamic random access memories (DRAM), static random access memories (SRAM), magnetic hard disk, optical disk, flash memory, electrically programmable read only memories (EPROM), or other types of computer readable storage media.

The sensor 930 may include one or more sensors. For example, the sensor 930 may include an image photographing device for acquiring an original image. The image photographing device may include a device, such as a camera and the like, for capturing still images or moving images, and the like. The image photographing device may include a lens assembly having one more lenses, image sensors, image signal processors, and/or flashes. The lens assembly included in a camera module may collect light emanating from a subject to be imaged. Further, the sensor 930 may include a sensor for detecting various data (e.g., acceleration sensor, gyroscope, magnetic field sensor, proximity sensor, illuminance sensor, fingerprint sensor, etc.)

The input device 940 may receive a user input through at least one of tactile input, haptic input, video, audio, and touch input. The input device 940 may include any other device capable of detecting an input, for example at least one of a keyboard, a mouse, a touch screen, a microphone, a digital pen (e.g., a stylus pen, etc.), etc., and transmitting the detected input.

The output device 950 may provide the output of the electronic device 900 to a user as at least one of a visual output, an auditory output, and a haptic output. For example, the output device 950 may include at least one of a liquid crystal display, a light emitting diode (LED) display, a touch screen, a speaker, a vibration generator, and any other device capable of providing the output to the user. The output device 950 may provide results of at least one of image encoding and image decoding, processed by the processor 910, using one or more of visual information, auditory information, and haptic information.

The network device 960 may communicate with an external device through at least one of a wired network and a wireless network. For example, the network device 960 may receive or transmit processing results of the processor 910, e.g., at least one of the bitstream, the reconstructed image, and the original image related to image encoding and image decoding, etc., to or from an external device. For example, the network device 960 may communicate with the external device using various wired or wireless communication techniques, for example at least one of Bluetooth communication, Bluetooth Low Energy (BLE) communication, near field communication (NFC), wireless local-area network (WLAN) communication, Zigbee communication, Infrared Data Association (IrDA) communication, Wi-Fi Direct (WFD) communication, ultra-wideband (UWB) communication, Ant+ communication, Wi-Fi communication, radio frequency identification (RFID) communication, 3G communication, 4G communication, 5G communication, direct connection via an internal bus, and the like.

Figure 10A:
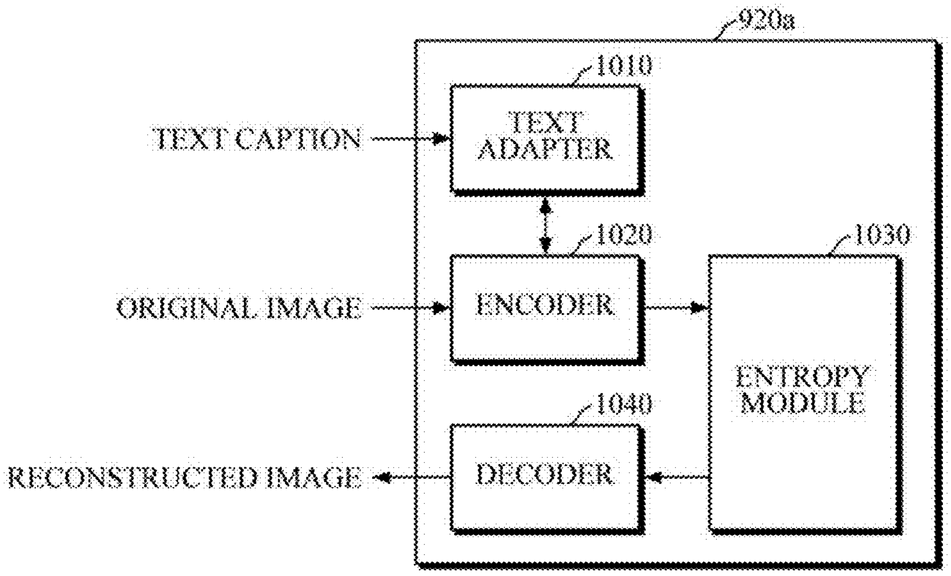
FIGS. 10A and 10B are block diagrams illustrating examples of a processor configured to perform image encoding and decoding in an electronic device according to an embodiment of the present disclosure.
Figure 10B:
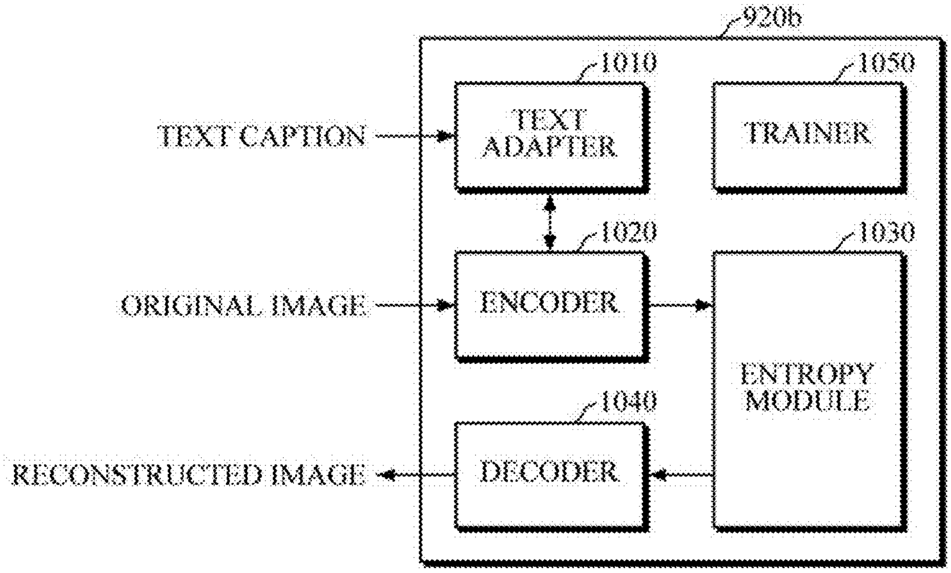

FIGS. 10A and 10B are block diagrams illustrating examples of a processor configured to perform image encoding and decoding in an electronic device.

Referring to FIGS. 10A and 10B, processors 920*a* and 920*b* each may include at least one of a text adapter 1010, an encoder 1020, an entropy module 1030, and a decoder 1040. In addition, the processor 920*b* may further include a trainer 1050.

A text caption may be input to the text adapter 1010 and an original image may be input to the encoder 1020, and the text adapter 1010 and the encoder 1020 may interact with each other to output a latent representation including an image feature in which text caption information is reflected. In embodiments, the encoder 1020 and the text adapter 1010 may interact with each other by communicating with each other, for example by transmitting or receiving information such as intermediate image features, text features, and relevance information. In embodiments, an image feature in which text caption information is reflected may refer to, for example, an image feature which is generated or obtained with respect to, in consideration of, or based on the text caption information.

The output latent representation may be input to the entropy module 1030, so that the latent representation may be entropy-encoded to be transformed into a bitstream, and the transformed bitstream may be stored in the storage device 920 or may be transmitted to an external device through the network device 960. The bitstream stored in the storage device 920 or the bitstream received from the external device through the network device 960 may be input to the entropy module 1030 so that the bitstream may be entropy-decoded to be reconstructed into a reconstructed latent representation, and the reconstructed latent representation may be input to the decoder 1040 to be reconstructed into a reconstructed image.

Referring to FIG. 10A, using a plurality of original images for training and a reconstructed image for training which is reconstructed by the decoder 1040, the trainer 1050 may train at least one of the text adapter 1010, the encoder 1020, the entropy module 610, and the decoder 620 so that a value of the multi-modal objective function is minimized or otherwise decreased, as described above.

The present disclosure can be realized as a computer-readable code written on a computer-readable recording medium. The computer-readable recording medium may be any type of recording device in which data is stored in a computer-readable manner.

Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that a computer-readable code is written thereto and executed therefrom in a decentralized manner. Functional programs, codes, and code segments needed for realizing the present invention can be readily inferred by programmers of ordinary skill in the art to which the invention pertains.

The present disclosure has been described herein with regard to preferred embodiments. However, it will be obvious to those skilled in the art that various changes and modifications can be made without changing the scope of the present disclosure. Thus, it is clear that the above-described embodiments are illustrative in all aspects and are not intended to limit the present disclosure.

What is claimed is:

1. An image encoding apparatus comprising:

a text adaptation processor configured to generate relevance information indicating a relevance between an image feature and a text feature based on text caption information corresponding to an original image; and an encoder configured to receive the relevance information and the original image as input, and to generate a latent representation which represents the text caption information and the image feature using the relevance information and the original image, wherein the encoder is further configured to generate an intermediate image feature based on the original image and provide the intermediate image feature to the text adaptation processor, and wherein the text adaptation processor is further configured to receive the intermediate image feature from the encoder, generate the relevance information based on the text caption information and the intermediate image feature, and communicate with the encoder while generating the relevance information.

2. The image encoding apparatus of claim 1, wherein the text adaptation processor is further configured to:

generate an embedding vector based on the text caption information, wherein the embedding vector is included in a latent space shared by image and text; and generate the relevance information based on the embedding vector and an-the intermediate image feature generated by the encoder.

3. The image encoding apparatus of claim 2, wherein the text adaptation processor comprises one or more layers configured to obtain the relevance information by gradually reducing a domain difference between the image and the text of the embedding vector using cross-attention processing.

4. The image encoding apparatus of claim 3, wherein the text adaptation processor further comprises:

a first adaptation layer configured to receive a first intermediate image feature generated by the encoder, and to generate first relevance information based on the first intermediate image feature using the cross-attention processing; and a second adaptation layer configured to receive a second intermediate image feature generated by the encoder based on the first relevance information, and to generate second relevance information based on the second intermediate image feature using the cross-attention processing.

5. The image encoding apparatus of claim 4, wherein the text adaptation processor further comprises a third adaptation layer configured to generate an updated text feature based on the second intermediate image feature using the cross-attention processing, and wherein the second adaptation layer is configured to output the second relevance information based on the updated text feature and the second intermediate image feature.

6. The image encoding apparatus of claim 5, wherein at least one of the first adaptation layer, the second adaptation layer, and the third adaptation layer comprises a linear module configured to apply a linear function to a result of the cross-attention processing.

7. The image encoding apparatus of claim 4, wherein the encoder comprises:

a first encoding layer configured to receive the oriigional image and to generate the first intermediate image feature; and a second encoding layer configured to generate the second intermediate image feature based on the first intermediate image feature and the first relevance information.

8. The image encoding apparatus of claim 7, wherein the encoder further comprises a third encoding layer configured to output the latent representation based on the second intermediate image feature and the second relevance information.

9. The image encoding apparatus of claim 8, wherein each of the first encoding layer, the second encoding layer, and the third encoding layer comprises at least one of a convolutional neural network (CNN), a residual block, and an attention module.

10. The image encoding apparatus of claim 1, further comprising an entropy encoder configured to perform entropy encoding on the latent representation to transform the latent representation into a bitstream.

11. An image decoding apparatus comprising:

at least one processor; and a memory configured to store instructions which, when executed by the at least one processor, cause the image decoding apparatus to:

perform entropy decoding on a bitstream generated by an image encoding apparatus based on a latent representation which represents text caption information and an image feature associated with an original image; and generate a reconstructed image corresponding to the original image based on a result of the entropy decoding, wherein the latent representation is generated by:

generating, by an encoder, an intermediate image feature based on the original image, and providing the intermediate image feature to a text adaptation processor, and generating relevance information, by the text adaptation processor, based on the text caption information corresponding to the original image and the intermediate image feature, and providing the original image and the relevance information indicating a relevance between the image feature and a text feature corresponding to the text caption information as input to the encoder.

12. An image encoding method for encoding an image using an image encoding apparatus, the image encoding method comprising:

generating, using an encoder included in the image encoding apparatus, an intermediate image feature based on an original image, and providing the intermediate image feature to a text adaptation processor included in the image encoding apparatus;

generating, using the text adaptation processor, relevance information indicating a relevance between an image feature and a text feature based on text caption information corresponding to the original image and the intermediate image feature; and providing the relevance information and the original image as input to the encoder, and generating, using the encoder, a latent representation which represents the text caption information and the image feature using the relevance information based on the original image.

13. The image encoding method of claim 12, wherein the generating of the relevance information comprises:

generating an embedding vector, which is included in a latent space shared by image and text, based on the text caption information; and generating the relevance information based on the embedding vector and the intermediate image feature generated by the encoder.

14. The image encoding method of claim 13, wherein the generating of the relevance information further comprises:

generating first relevance information based on a first intermediate image feature using cross-attention processing, wherein the first intermediate image feature is generated by the encoder; and generating second relevance information based on a second intermediate image feature using the cross-attention processing, wherein the second intermediate image feature is generated by the encoder based on the first relevance information.

15. The image encoding method of claim 14, wherein the generating of the relevance information further comprises generating an updated text feature based on the second intermediate image feature using the cross-attention processing, and wherein the second relevance information is generated based on the updated text feature and the second intermediate image feature.

16. The image encoding method of claim 14, wherein the generating of the latent representation comprises:

obtaining the first intermediate image feature based on the original image; and obtaining the second intermediate image feature based on the first intermediate image feature and the first relevance information.

17. The image encoding method of claim 16, wherein the latent representation is generated based on the second intermediate image feature and the second relevance information.

18. The image encoding method of claim 12, further comprising performing entropy encoding on the latent representation to transform the latent representation into a bitstream.

19. An electronic device comprising:

at least one processor; and a memory configured to store one or more instructions which, when executed by the at least one processor, cause the electronic device to:

generate, using an encoder, an intermediate image feature based on an original image, and provide the intermediate image feature to a text adaptation processor;

generate, using the text adaptation processor, relevance information indicating a relevance between an image feature and a text feature based on text caption information corresponding to the original image and the intermediate image feature;

provide the relevance information and the original image as input to the encoder, and generate, using the encoder, a latent representation which represents the text caption information and the image feature using the relevance information based on the original image;

perform entropy encoding on the latent representation to generate a bitstream, and to perform entropy decoding on the generated bitstream; and generate, using a decoder, a reconstructed image corresponding to the original image based on a result of the entropy decoding, wherein the text adaptation processor is configured to communicate with the encoder while generating the relevance information.

20. The electronic device of claim 19, wherein the at least one processor is further configured to train at least one of the text adaptation processor, the encoder, and the decoder such that a value of a predetermined multi-modal objective function is minimized.

* * * * *